(12) United States Patent
Walker

(10) Patent No.: X3253
(45) Date of Patent: Nov. 16, 1820

(54) SADDLES

(76) Inventor: Elisha Walker

United States Patent Patent No.: X3253

Elihu Walker.

Letters Patent

The schedule referred to in these Letters Patent and making part of the same, containing a description in the words of the said Elihu Walker himself of his improvement in making saddles.

Cut whole of one entire piece of leather the skirts or jockeys of the seat, the [illegible] or back part of the saddle, and the back part of the draw-downs so as to have the saddle made and not have it seamed up in the usual form. or in any other manner the workman shall choose, as far back as is necessary. Back of the skirts or jockeys the seat is to drawn under the saddle tree, for a draw down, to nail the seat and the skirts or jockeys on with
The draw down is a piece of leather sewed on the under side of the skirts or jockeys to draw under the saddle to nail the skirts or jockeys and the seat on with.

Witnesses
Jos W. Moulton
A. W. Bailey.

Elihu Walker.

Ex?
Ch[illegible]

10 [illegible]

(Patented November 16. 1820)

Not required

2—328 a.

DRAFTSMAN'S DIVISION.

*All communications should be addressed to* "The Commissioner of Patents, Washington, D. C."

*DEPARTMENT OF THE INTERIOR,*

United States Patent Office,

*Washington, D. C.,* ............ , *189*...

*SIR:*

*The printed* ....copies.... *of Patent No.* E Walker

....are.... *exhausted.* Nov 16, 1820

*As soon as printed a copy will be mailed you to complete your order.*

*By direction of the Commissioner:*

*Very respectfully,*

*Chief Clerk.*

814366-97-5m